United States Patent [19]

Peters

[11] 4,289,682

[45] Sep. 15, 1981

[54] CURABLE RESIN COMPOSITIONS COMPRISING HYDROXYL-TERMINATED UNSATURATED POLYESTER OLIGOMER, A POLYISOCYANATE, AN ETHYLENICALLY UNSATURATED MONOMER AND A CATALYST

[75] Inventor: Edward N. Peters, Piscataway, N.J.

[73] Assignee: Union Carbide Corporation, New York, N.Y.

[21] Appl. No.: 107,084

[22] Filed: Dec. 26, 1979

[51] Int. Cl.$^3$ ............................................. C08L 75/08
[52] U.S. Cl. ................................. 260/37 N; 525/28; 525/440; 528/48; 528/75; 528/80; 528/83
[58] Field of Search ............... 260/37 N; 525/28, 440; 528/48, 75, 80, 83

[56] References Cited

U.S. PATENT DOCUMENTS

| | | | |
|---|---|---|---|
| 3,008,917 | 11/1961 | Park et al. | 525/440 |
| 4,073,828 | 2/1978 | Farrarini et al. | 264/294 |
| 4,125,487 | 11/1978 | Olstowski | 528/75 |
| 4,165,307 | 8/1979 | Mizuno et al. | 525/440 |
| 4,213,837 | 7/1980 | Bristowe et al. | 525/440 |

OTHER PUBLICATIONS

Saunders et al., *Polyurethanes II,* Interscience, New York, 1964, p. 319.

*Primary Examiner*—Maurice J. Welsh
*Attorney, Agent, or Firm*—Donald M. Papuga

[57] ABSTRACT

Described herein is a curable resin composition comprising a homogeneous mixture of a hydroxyl-terminated unsaturated polyester oligomer, a polyisocyanate, an ethylenically unsaturated monomer, and a polyurethane forming catalyst.

22 Claims, No Drawings

CURABLE RESIN COMPOSITIONS COMPRISING HYDROXYL-TERMINATED UNSATURATED POLYESTER OLIGOMER, A POLYISOCYANATE, AN ETHYLENICALLY UNSATURATED MONOMER AND A CATALYST

This invention is directed to a curable resin composition comprising a homogeneous mixture of a hydroxyl-terminated polyester oligomer, a polyisocyanate, an ethylenically unsaturated monomer and a catalyst capable of catalyzing polyurethane forming reactions of polyisocyanates and the hydroxyl-terminated polyester oligomer. The compositions of this invention can be employed in the manufacture of composite structures, and particularly in the manufacture of fiber-reinforced plastic compositions.

There are many publications directed to compositions containing olefinically unsaturated polyester polyols, an olefinically unsaturated monomer and a polyisocyanate. For example, U.S. Pat. No. 3,008,917 discloses the preparation of polyisocyanate-polyester adducts which are subsequently reacted with vinyl monomer, such as styrene, to form coatings, castings, laminates, adhesives, etc. This patent teaches the need to use hot styrene for the purpose of dissolving the high molecular weight polyisocyanate polyester adduct (col. 5, lines 6–9). This causes additional handling and safety difficulties as well as requires the presence of a gelation inhibitor specified by the patent during the difficult mixing stage. Additionally, the patent describes that large amounts of unreacted isocyanate groups must be used.

U.S. Pat. No. 4,073,828 is directed to gelled vinylidene solutions of ethylenically unsaturated polyesters employing a urea-linked linear polyester/polyurethane resin free of ethylenic unsaturation as the gelling or thickening agent. These solutions are suitable for molding and casting.

A molded article is formed in this patent in the following three steps:
Step 1—form a vinylidene monomer solution having dissolved therein an isocyanate terminated linear polyester/polyurethane free of ethylenic unsaturation;
Step 2—gel or thicken the vinylidene monomer solution by intermixing with an organic diamine with agitation to form a homogeneous mixture; and
Step 3—inject the gelled material into a mold and initiate the polymerization of the vinylidene monomer.

In Table II, Formula G, the unsaturated polyester resin is produced from 1 mole of 2,2-propoxylated-bisphenol-A and 1 mole of fumaric acid. In Example 3, 100 parts of this polyester and 30 parts of Formula A, in Table I, i.e., a polyester diol of 1.0 mole of adipic acid, 0.99 mole of ethylene glycol, 0.056 mole of diethylene glycol and 0.06 mole of monoethanol amine, which polyester is reacted with toluene diisocyanate, are mixed with and reacted with 1.04 parts of trimethyl hexamethylene diamine to form a gel in about 25 minutes. Castings are prepared from such compositions.

However, the prior art compositions are difficult to handle and prepare. The novel composition of the present invention is easily prepared and handled. Additionally, the compositions of this invention can be used to prepare composites which can contain high levels of fibers and which surprisingly exhibit outstanding mechanical properties.

THE INVENTION

It has now been found that a curable resin composition comprising a homogeneous mixture of a hydroxy-terminated unsaturated polyester oligomer, polyisocyanate, an ethylenically unsaturated monomer and a catalyst capable of catalyzing polyurethane forming reactions of polyisocyanate and the hydroxy-terminated polyester oligomer can be used to form high strength rigid shaped articles. These articles are preferably fiber reinforced.

The hydroxy-terminated unsaturated polyester oligomers of this invention are prepared by forming an alkoxylated derivative of a diol and then reacting the alkoxylated diol with maleic anhydride, fumaric acid or fumaryl chloride.

The diols suitable for use in this invention are represented by the following formula:

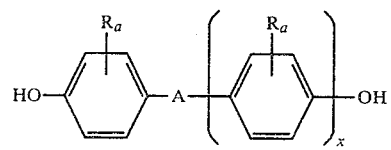

wherein R is independently selected from alkyl groups of 1 to 4 carbon atoms, chlorine or bromine, a independently has a value of from 0 to 4, inclusive, and A is independently selected from a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, $SO_2$, and CO, x is 0 or 1.

The diols that may be used in this invention include the following:
2,2-bis-(4-hydroxyphenyl) propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and
naphthalene diols.

These diols may be used individually or in any combination.

The diol, as described, is reacted with an alkylene oxide to form the alkoxylated derivative thereof by methods well known in the art and as found, for example, in U.S. Pat. No. 4,163,114.

The alkylene oxides suitable for use in forming the diol alkoxylates are the oxirane compounds, such as styrene oxide, ethylene oxide, 1,2-propylene oxide, 1,3-propylene oxide, as well as similar higher aliphatic monoepoxides.

The most preferred alkoxylated diols are ethoxylated bisphenol A and propoxylated bisphenol A of the following formulas:

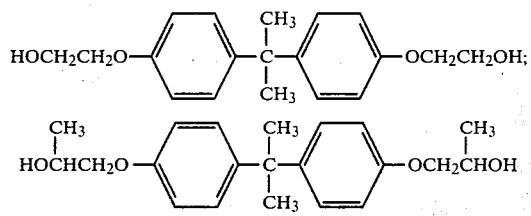

The hydroxy-terminated, unsaturated polyester oligomers are prepared by reacting two moles of the alkoxylated diol with one mole of maleic anhydride, fumaric acid or fumaryl chloride.

The reaction of the alkoxylated diol with maleic anhydride, fumaric acid or fumaryl chloride takes place at temperatures of from about 50° to about 200° C.

The reaction of ethoxylated bisphenol-A with fumaryl chloride and maleic anhydride to yield the polyester oligomer is illustrated as follows:

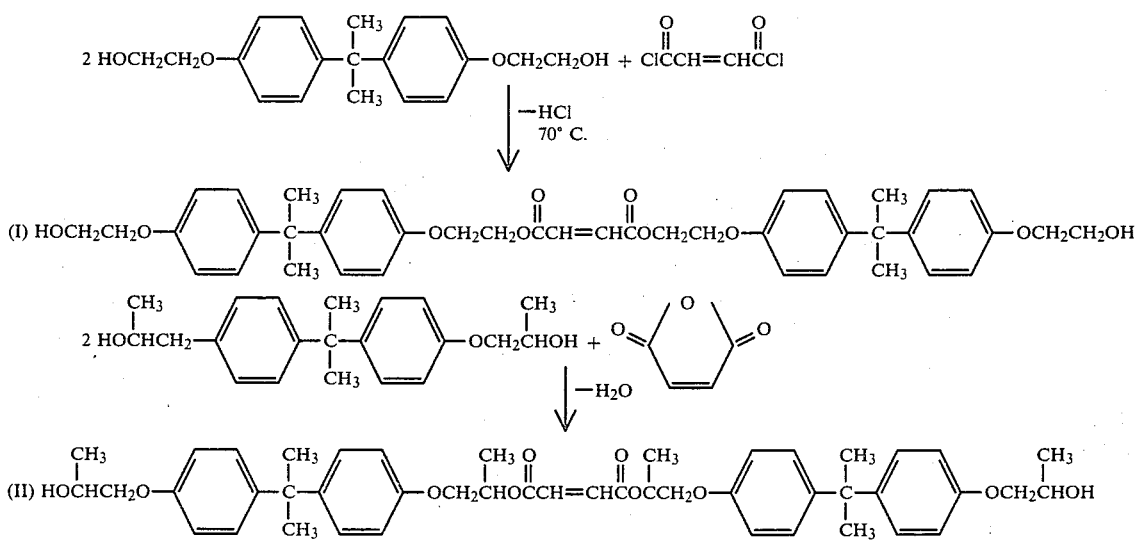

The hydroxy-terminated, unsaturated polyester oligomers, illustrated by formulas (I) and (II) are low molecular weight materials having a molecular weight of from about 800 to about 1600. These polyester oligomers have a low acid number of less than about 0.5.

Although the oligomers are illustrated as a single compound by formulas (I) and (II), the oligomers are actually a mixture of materials, with the major material being the oligomer depicted by the structural formula (I) or (II).

The polyisocyanates that are useful in accordance with this invention are organic compounds that contain at least two isocyanate groups, such compounds are well known in the art. The organic polyisocyanates that are useful in the novel compositions in accordance with this invention are organic compounds that contain at least two isocyanate groups and include the monomeric and polymeric organic polyisocyanates such as prepolymers produced by reacting a polyol with an excess of a polyisocyanate. The quasi-prepolymers such as the reaction products of excess tolylene diisocyanate and short chain polyoxypropylene diols or triols, are preferred in those instances where ease of processing such materials is desired. Suitable organic polyisocyanates include the hydrocarbon diisocyanates (e.g., the alkylene diisocyanates and the arylene diisocyanates) as well as known triisocyanates. As examples of suitable polyisocyanates one can mention, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl) ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 2,4-diisocyanatotoluene, 2,6-diisocyanatotoluene and mixtures thereof, 1,3-diisocyanato-o-xylene, 1-3-diisocyanato-m-xylene, 1,3-diisocyanato-p-xylene, 2,4-diisocyanato-1-chlorobenzene, 2,4-diisocyanato-1-chlorobenzene, 2,4-diisocyanato-1-nitrobenzene, and 2,5-diisocyanato-1-nitrobenzene, 4,4'-diphenylmethylene diisocyanate, 3,3'-diphenylmethylene diisocyanate, 2,4'-diphenylmethylene diisocyanate, modified diphenylmethylene diisocyanates modified with carbodiimides to liquefy same, and polymethylene poly(phenyleneisocyanates) having the formula:

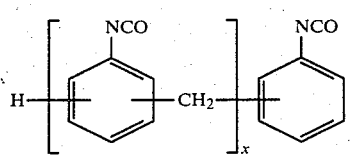

wherein x has an average value from 1.1 to 5 inclusive (preferably from 2.0 to 3.0), and mixtures thereof.

The amount of polyisocyanate used is not narrowly critical and preferably ranges from an amount that provides about 0.9 isocyanate group of the polyisocyanate per hydroxyl group of the polyester oligomer to an amount that provides about 1.2 isocyanate groups per hydroxyl group of the polyester oligomer. These amounts are suitable when the compositions are cast in a mold. In the event, however, the RIM method is used or low pressure molding or the sheet molding technique is used, the range preferably is from about 1 to about 1.1 isocyanate groups of the polyisocyanate per hydroxyl group of the polyester oligomer. For the compression molding method, that is the slow cure method, the broad range is about 0.9 to about 1.1 and the preferred range is about 0.98 to about 1.02 isocyanate groups of the polyisocyanate per hydroxyl group of the polyester oligomer.

In the practice of this invention the polyester oligomer and polyisocyanate are used in combination of from about 40 to about 60 weight percent.

The catalysts that are useful in catalyzing the polyurethane-formation of the polyester oligomer and polyisocyanate in accordance with this invention include: (a) tertiary amines such as bis(dimethylaminoethyl)-ether, trimethylamine, triethylamine, N-methylmorpholine, N-ethylmorpholine, N,N-dimethylbenzylamine, N,N-dimethylethanolamine, N,N,N'N'-tetramethyl-1,3-butane-diamine, triethylanolamine, 1,4-diazabicyclo[2.2.2.] octane, pyridine octane and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetyl-acetoneimine, bis-acetylacetonealkylenediimines, salicyclaldehydiimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_2$, $Al(OR)_3$, and the like, wherein R is alkyl or aryl, and the reaction products of alcoholates with carboxylic acids, betadiketones, and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi and metal carbonyls of iron and cobalt.

The organotin compounds deserve particular mention as catalysts for catalyzing the polyurethane-forming reactions. These compounds include the dialkyltin salts of carboxylic acids, e.g., dibutyltin diacetate, dibutyltin dilaurate, dibutyltin maleate, dilauryltin diacetate, dioctyltin diacetate, dibutyltinbis(6-methylaminocaproate), and the like. Similarly, there may be used a trialkyltin hydroxide, dialkyltin oxide, dialkyltin dialkoxide, or dialkyltin dichloride. Examples of these compounds include trimethyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalysts. Metal catalysts, or combinations of metal catalysts, may also be employed as the accelerating agents, without the use of amines. The catalysts for catalyzing the polyurethane-forming reaction are employed in small amounts, for example, from about 0.001 percent to about 5 percent, based on the combined weight of the polyisocyanate and the polyester oligomer.

Suitable ethylenically unsaturated monomers which may be employed in the practice of this invention are one or more monomers which contain a $-CH=C<$ group, and preferably a $CH_2=C<$ group. These monomers include styrene and its derivatives and homologues, diallyl phthalate, divinylbenzene, acrylic acid or methacrylic acid and their derivatives such as their esters, amides or nitriles, e.g., methyl acrylate, methyl methacrylate, n-butyl methacrylate, acrylamide, methacrylamide, acrylonitrile, methacrylonitrile, and the like. Also, the monomers include vinyl ethers and esters, e.g., vinyl acetate, vinyl propionate, methyl vinyl ether, triallyl cyanurate, 1,3-butanediol dimethacrylate, and the like. Mixtures of the aforementioned monomers may be effectively employed in the practice of this invention.

The most preferred ethylenically unsaturated monomer contemplated in the practice of this invention is styrene.

The ethylenically unsaturated monomer is used in amounts of from about 30 to about 70 weight percent.

It is sometimes desirable to inhibit the vinyl polymerization for storage and shipping purposes and/or until such that the polyurethane reaction has begun and proceeded to a substantial extent. For example, to the extent of 50% or more. It is, furthermore, especially preferred to utilize a vinyl polymerization inhibitor in those cases where the polyester oligomer and/or polymerizable ethylenically unsaturated monomers are to be stored, shipped or sold. Suitable vinyl polymerization inhibitors are hydroquinone, quinone, para-benzoquinone, t-butyl catechol, quinhydrone, toluhydroquinone, mono-t-butylhydroquinone, 2,5-di-t-butylhydroquinone, hydroquinone monomethyl either, the biphenol derivatives described in U.S. Pat. No. 4,158,027, and the like. Para-benzoquinone is the preferred inhibitor. The amount of inhibitor for the purpose of preventing vinyl polymerization can be that conventionally used, namely from about 100 to about 300 ppm of the combined weight of the polyester oligomer and ethylenically unsaturated monomer.

The composition of this invention can be cured by free radical mechanisms such as, electron beam radiation, actinic radiation, azo and peroxide curing agents such as those which are described by Gallagher, et al. "Organic Peroxides Review", Plastics Design & Processing, July, 1978, pages 38–42, and August, 1978, pages 60–67, inclusive. The Technology disclosed in those two articles is incorporated herein by reference. The choice of the specific peroxide or azo initiators for the purpose of curing the composition of this invention is within the purview of those having skill in this art and the manner in which such peroxides and azo initiators operate to effect a desirable cure is generally characterized in the aforementioned articles.

Illustrative of a few such catalysts are 2,2'-azo-bis-isobutyronitrile, dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperoctate, t-butylperneodecanoate, t-butylperbenzoate, t-butylpercrotonate, t-butyl perisobutyrate, di-t-butyl perphthalate, and the like.

The concentration of the curing agent is not critical and can be varied within wide limits. As a representative range, the concentration can vary from about 0.1 to about 5 wt. percent based on the total weight of polyester oligomer and ethylenically unsaturated monomer.

The composition of this invention can be prepared by reacting the above-described polyester oligomer with a polyisocyanate and a polymerizable ethylenically unsaturated monomer at a temperature of from about 100° to about 160° C. or by reacting the above described mixture at ambient temperatures and completing the reaction at from about 100° to about 160° C. The isocyanate groups of the polyisocyanate react with the hydroxyl groups of the polyester oligomer at ambient or elevated temperatures to form a polyurethane. Cross-linking occurs through vinyl polymerization of the olefinically unsaturated groups of the polyester oligomer at elevated temperatures, and the polymerizable ethylenically unsaturated monomer to thereby result in a cross-linked polymeric material characterized by good mechanical properties. In these polymerization reactions there can be used a catalyst capable of catalyzing polyurethane-forming reactions of polyisocyanates and polyhydroxyl compounds and a curing agent capable of catalyzing the vinyl polymerization of the polymerizable ethylenically unsaturated monomer with itself and with the polyester oligomer. A vinyl polymerization inhibitor can be used for the purpose of stabilizing mixtures of the polyester oligomer and ethylenically unsaturated monomer during shipment or storage and to control the vinyl polymerization, and for other purposes.

The compositions of this invention can be cured neat or in combination with fillers, pigments, fibers with a melting point or a transition temperature above about 130° C. such as fiberglass, carbon fibers and aromatic polyamide fibers (such as aramid fibers sold by E. I. DuPont Nemours, Wilmington, Delaware and sold under the trademark Kevlar), and the like. The cured composition can contain from about 15 to about 75 weight percent of fibers, preferably glass fibers.

A method of preparing polymeric material from the compositions of this invention is the bulk molding method and involves mixing the polyester oligomer, the ethylenically unsaturated monomer, the polyisocyanate, the curing agent and the vinyl polymerization inhibitor, if used, following which solid additives, such as, fillers, pigments, are added and mixed until a substantially homogeneous mixture is obtained. Thereafter, the mixture can be molded by the application of heat and pressure. It is desirable after blending all of the above-mentioned components to allow the mixture to maturate with time to reach the desired molding viscosity, for example, 100 to $10^8$ cps at 25° C. During maturation, measures are usually taken to prevent the loss of volatile materials, e.g. styrene. For example, the mixture can be encapsulated in aluminum foil to prevent evaporation of the volatile materials. In the bulk molding method the maturated mixture, if desired, can be placed in transfer molding equipment or in injection molding equipment and transfer molded or injection molded in the conventional manner.

Furthermore, the maturated mixture can be employed as a sheet molding compound, for example, by doctoring a sheet of the mixture on polyethylene film followed by overlaying the sheet of mixture with another polyethylene film and cutting the sandwich into the desired shape. Optionally, the fiber, such as glass fiber can be sprinkled onto the mixture sheet prior to overlaying with the second polyethylene film and compressing the resulting sandwich after overlaying the mixture sheet with the second polyurethane film. This latter technique can avoid undue equipment wear by avoiding the need for mixing and handling mixtures containing glass fibers. The sandwich following cutting can be shaped into the desired shape and heated and compressed to cure the mixture into the desired shape.

Another method of producing the polymeric materials from the compositions of this invention is to mix the polyester oligomer, ethylenically unsaturated monomer, the curing agent and the polyurethane reaction catalyst and withholding the polyisocyanate until it is desired to initiate the polyurethane reaction. Upon mixing the polyisocyanate into the above-mentioned mixture, the polyurethane-forming reaction is initiated and provides an exotherm which initiates the vinyl polymerization reaction by the free radical formed upon heat decomposition of the vinyl polymerization catalyst. This method has the advantage that the polyester oligomer, ethylenically unsaturated monomer and curing agent can be further mixed with a vinyl polymerization inhibitor and the resulting mixture can be stored, shipped and/or sold.

A third method of producing the polymeric materials from the composition of this invention is by the RIM (reaction injection molding) process. In this process, two packages are prepared for subsequent rapid mixing and molding by machine. One package comprises a mixture of the polyester oligomer, the ethylenically unsaturated monomer, the polyurethane reaction catalyst and a high level of vinyl polymerization inhibitor. The other package comprises a mixture of the polyisocyanate, optionally, ethylenically unsaturated monomer and the curing agent. Both packages, when properly formulated, are relatively stable such that they can be stored, shipped and/or sold. At the time of use the packages are rapidly and continuously mixed and molded into the desired shapes.

The compositions of this invention are particularly useful for the manufacture of rigid fiber reinforced molded articles. A preferred procedure for producing a molded article from this composition is described in U.S. Patent Application Ser. No. 035,011 entitled "Molding Process and Apparatus Therefore", and filed on May 1, 1979, now abandoned in favor of Ser. No. 135,906, filed on Apr. 14, 1980 in the name of R. Angell, Jr., which is incorporated herein by reference. In this application a process for rapidly fabricating fiber reinforced thermoset resin articles is described. The fiber reinforcement is comprised of one or more fibers with a melting point or a transition temperature above about 130° C. The process comprises the steps of (a) providing in a heatable matched metal die mold, a bonded web of one or more of said fibers, (b) providing in a accumulator zone, a liquid body of a thermosettable organic material having a viscosity determined at 120° C., in the absence of curing agent therefore, of less than about 50 centipoises, and which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom. The fiber reinforcement may be from about 15 to about 80 weight percent of the weight of the molded article which is removed from the mold.

In said U.S. patent application Ser. No. 135,906 the apparatus comprises (a) a heatable matched metal die mold containing one or more cavities therein with means for opening said mold to expose said cavities, and means for controlling the injection of a thermosettable organic liquid to said cavities when the mold is closed, (b) means associated with said mold, whereby an interlocked mass of fibers is provided in a portion of the cavity thereof, when the mold is open to receive such cavities and prior to the injection of thermosettable organic liquid to such cavities when the mold is closed, (c) accumulator means associated with said mold which can contain a thermosettable organic liquid transportable to means for controlling injection of said thermosettable liquid to such cavities, (d) cooling means associated with the means for controlling the injection of such liquid to such cavities, whereby the temperature of the liquid in such injection means is maintained substantially below the temperature of the mold.

In the instant process it is desirable to effect rapid mixing of the two reactive streams just prior to their entry into the mold. This can be accomplished by inserting an impingement mixing head or a static mixer in the nozzle and using two accumulator zones. In this configuration the polyester oligomer and the polyisocyanate component can be kept separate until parts are fabricated. The ethylenically unsaturated monomer may be stored in either or both accumulator zones.

Another preferred procedure for producing a molded article from the compositions of this invention comprises:

(a) providing in a distributing zone an intimate mixture of a mass of one or more fibers with a melting point or a transition temperature above about 130° C. with a liquid resin forming composition as heretofore described, (b) increasing the viscosity, or maturating, the mixture formed in the distributing zone (a) by partially polymerizing the resin forming composition by effecting reaction between the hydroxyl-terminated unsaturated polyester oligomer and polyisocyanate to a value of about 300,000 centipoise at 23° C., (c) injecting the maturated mixture of (b) into the cavity of a closed heated matched metal die mold, filling said cavity with said mixture, and (d) heating said mixture above the decomposition of the free-radical catalyst of said composition causing an exothermic free-radical reaction to occur in said mold, and (e) opening said mold and recovering the thermoset molded part therefrom.

The following Examples serve to illustrate specific embodiments of this invention and it is not intended that the invention be limited by the examples.

EXAMPLE 1

A casting was prepared by rapidly mixing two resin components followed by pouring into a 10×10×⅛ inch mold. One component consisted of 53.33 grams of the 2:1 adduct from the reaction of ethoxylated bisphenol A and fumaryl chloride, 20.74 grams styrene, 1.0 grams t-butylhydroperoxide and 0.4 grams dibutyl tin laurate. The other component consisted of 13.33 grams of 2,4-diisocyanatotoluene and 32.59 g styrene. The charged mold was heated at 80° C. for 16 hours and post cured for 6 hours at 125° C.

The flexural strength and modulus (measured according to ASTM D-790-66) and tensile strength and modulus (measured according to ASTM D-638-64T) are set forth in Table I.

EXAMPLE 2

A casting was prepared by rapidly mixing resin components A and B, followed by pouring into a 10×10×½ inch mold. Component A contained 47.44 g of the 2:1 adduct from the reaction product of ethoxylated bisphenol A and fumaryl chloride, 18.45 g styrene, 1.0 g t-butylperbenzoate and 0.1 g dibutyl tin dilaurate. Component B contained 25.12 g of I-181 (a diisocyanate from Upjohn Company prepared from the reaction of 4,4'-diphenylmethylene diisocyanate and dipropylene glycol such that the product has an isocyante equivalent of 181); and 28.99 g of styrene. The charged mold was heated at 80° C. for 16 hours and post cured for 6 hours at 125° C.

The flexural strength and modulus and tensile strength and modulus are set forth in Table I.

EXAMPLE 3

A casting was prepared by rapidly mixing two resin components followed by pouring into a 10×10×⅛ inch mold. One component consisted of 53.67 grams of the 2:1 adduct from the reaction of propoxylated bisphenol A and fumaryl chloride, 23.00 grams styrene, 1.0 grams t-butylhydroperoxide and 0.5 grams dibutyl tin laurate. The other component consisted of 12.66 grams of 2,4-diisocyanatotoluene and 30.67 g styrene. The charged mold was heated at 80° C. for 16 hours and post cured for 6 hours at 125° C.

The flexural strength and modulus and tensile strength and modulus are set forth in Table I.

EXAMPLE 4

A casting was prepared by rapidly mixing resin components A and B, followed by pouring into a 10×10×⅛ inch mold. Component A contained 47.82 g of the 2:1 adduct from the reaction product of propoxylated bisphenol A and fumaryl chloride, 20.49 g styrene, 1.0 g t-butylperbenzoate, 0.2 g dibutyl tin dilaurate. Component B contained 24.36 g of I-181 and 27.33 g styrene. The charged mold was heated at 80° C. for 16 hours and post cured for 6 hours at 125° C.

The flexural strength and modulus and tensile strength and modulus are set forth in Table I.

TABLE 1

PROPERTIES OF CASTING

| Example | Flexural Modulus (psi × 10⁵) | Flexural Strength (psi) | Tensile Modulus (psi × 10⁵) | Tensile Strength (psi) | Elongation at break (%) |
|---|---|---|---|---|---|
| 1 | 5.57 | 8,390 | 4.85 | 5,280 | 1.1 |
| 2 | 4.79 | 16,900 | 4.22 | 10,600 | 3.2 |
| 3 | 4.83 | 6,380 | 4.32 | 3,200 | 0.8 |
| 4 | 5.03 | 16,100 | 4.55 | 4,310 | 1.0 |

EXAMPLE 5

Approximately 90 grams (approximately five inch sheets) type AKM glass mat (PPG Industries, Inc. Pittsburgh, Penn) was placed in a 8×8×⅛ inch mold at ambient temperatures. The mold was closed and a resin prepared by the rapid mixing of components A and B were injected into the mold. The mold was heated to 70° C. and held at that temperature for 5 minutes. The temperature was then raised to 130° C. After 5 minutes the cured glass reinforced composite was removed. This composite contained 46 weight percent glass (the weight percent of glass in the composite was calculated by dividing the weight of the glass which was initially charged into the mold by the weight of the composite). Component A consisted of 53.33 grams of the 2:1 adduct from the reaction of ethoxylated bisphenol A and fumaryl chloride, 20.74 grams styrene. 1.0 grams t-butylhydroperoxide and 0.4 grams dibutyl tin dilaurate. Component B consist of 13.33 grams of 2,4-diisocyanototoluene and 32.59 g styrene.

The flexural strength and modulus (measured according to ASTM D 790-66) and tensile strength and modulus (measured according to ASTM D 638-64T) are set forth in Table II.

EXAMPLE 6

The procedure of Example 5 was exactly repeated except that component A contained 47.44 g of the 2:1 adduct from the reaction product of ethoxylated bisphenol A and fumaryl chloride, 18.45 g styrene, 1.0 g t-butyl perbenzoate, 0.1 g dibutyl tin dilaurate; and component B contained 25.12 g of I-181, and 28.99 g styrene.

This composite contained 49 weight percent glass and the flexural strength and modulus and tensile strength and modulus are set forth in Table II.

EXAMPLE 7

The procedure of Example 5 was exactly repeated except that component A contained 47.82 g of the 2:1 adduct from the reaction product of propoxylated bisphenol A and fumaryl chloride, 20.49 g styrene, 1.0 g t-butyl perbenzoate, 0.2 g dibutyl tin dilaurate; and component B contained 24.36 g of I-181 and 27.33 g styrene.

This composite contained 53 weight percent glass and the flexural strength and modulus and tensile strength and modulus are set forth in Table II.

TABLE II

PROPERTIES OF GLASS REINFORCED COMPOSITES

| Example | Glass % | Flexural Modulus (psi × 10⁶) | Flexural Strength (psi) | Tensile Modulus (psi × 10⁶) | Tensile Strength (psi) | Elongation at break (%) |
|---|---|---|---|---|---|---|
| 5 | 46 | 1.45 | 35,600 | 1.40 | 23,800 | 2.1 |
| 6 | 49 | 1.68 | 45,600 | 1.51 | 26,600 | 2.1 |
| 7 | 53 | 1.75 | 52,200 | 1.66 | 31,800 | 2.3 |

What is claimed is:

1. A curable resin composition comprising:
   (a) a hydroxyl-terminated unsaturated polyester oligomer,
   (b) a polyisocyanate,
   (c) an ethylenically unsaturated monomer, and
   (d) a catalyst capable of catalyzing polyurethane-forming reactions of the polyester oligomer and the polyisocyanate.

2. A composition as defined in claim 1 wherein the oligomer is the reaction product of an alkoxylated derivative of a diol and maleic anhydride, fumaric acid or fumaryl chloride.

3. A composition as defined in claim 2 wherein the alkoxylated diol is alkoxylated bisphenol A.

4. A composition as defined in claim 3 wherein the alkoxylated bisphenol A is ethoxylated bisphenol A.

5. A composition as defined in claim 3 wherein the alkoxylated bisphenol A is propoxylated bisphenol A.

6. A composition as defined in claim 1 wherein the oligomer has an acid number of less than about 0.5.

7. A composition as defined in claim 1 wherein the polyisocyanate is monomeric or polymeric.

8. A composition as defined in claim 1 wherein the ethylenically unsaturated monomer is styrene.

9. A composition as defined in claim 1 which contains a polymerization inhibitor.

10. A cured molded article prepared from the composition of claim 1.

11. A cured molded article as defined in claim 10 which contains from about 15 to about 75 weight percent of one or more fibers with a melting point or a glass transition temperature above about 130° C.

12. A cured molded article as defined in claim 11 wherein the fiber is glass.

13. A composition as defined in claim 1 wherein the oligomer is the reaction product of an alkoxylated derivative of a diol and fumaric acid.

14. A composition as defined in claim 13 wherein the ethoxylated derivative of a diol is ethoxylated bisphenol A.

15. A composition as defined in claim 1 wherein the oligomer is the reaction product of an alkoxylated derivative of a diol and fumaryl chloride.

16. A composition as defined in claim 15 wherein the ethoxylated derivative of a diol is ethoxylated bisphenol A.

17. A composition as defined in claim 1 wherein the polyester oligomer and polyisocyanate are used in combination of from about 40 to about 60 weight percent.

18. A composition as defined in claim 1 wherein the ethylenically unsaturated monomer is used in amounts of from about 30 to about 70 weight percent.

19. A process for preparing a curable resin composition which comprises reacting a hydroxyl-terminated unsaturated polyester oligomer with a polyisocyanate and a polymerizable ethylenically unsaturated monomer at a temperature of from about 100° to about 160° C.

20. A process for preparing a curable resin composition which comprises reacting a hydroxyl-terminated unsaturated polyester oligomer with a polyisocyanate and a polymerizable ethylenically unsaturated monomer at ambient temperatures and then completing the reaction at from about 100° to about 160° C.

21. A process as defined in claims 19 or 20 wherein a catalyst capable of catalyzing polyurethane-forming reactions of polyisocyanates and polyhydroxyl compounds is used.

22. A curable resin composition comprising:
(a) a hydroxyl-terminated unsaturated polyester oligomer having an acid number of less than about 0.5.
(b) a polyisocyanate,
(c) an ethylenically unsaturated monomer comprising styrene, and
(d) a catalyst capable of catalyzing polyurethane-forming reactions of the polyester oligomer and the polyisocyanate.

* * * * *